United States Patent
Iwasaki et al.

(10) Patent No.: US 6,870,022 B2
(45) Date of Patent: Mar. 22, 2005

(54) PROCESS FOR PRODUCING α-OLEFIN POLYMER

(75) Inventors: Takeshi Iwasaki, Chiba (JP); Tadanori Jyunke, Chiba (JP); Kiyokazu Katayama, Chiba (JP); Kenji Tanaka, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 60 days.

(21) Appl. No.: 10/333,924

(22) PCT Filed: Jul. 26, 2001

(86) PCT No.: PCT/JP01/06446

§ 371 (c)(1),
(2), (4) Date: Feb. 4, 2003

(87) PCT Pub. No.: WO02/12352

PCT Pub. Date: Feb. 14, 2002

(65) Prior Publication Data

US 2004/0030068 A1 Feb. 12, 2004

(30) Foreign Application Priority Data

Aug. 4, 2000 (JP) .......................................... 2000-237105
Feb. 9, 2001 (JP) .......................................... 2001-33700

(51) Int. Cl.$^7$ .............................................. C08F 210/06
(52) U.S. Cl. .................... 526/348; 526/351; 526/123.1; 526/124.1; 526/124.3
(58) Field of Search ................................ 526/348, 351, 526/123.1, 124.1, 124.3

(56) References Cited

U.S. PATENT DOCUMENTS 4,380,608 A * 4/1983 Hasuo et al. ................. 525/247
4,978,722 A * 12/1990 Goko et al. .................. 525/255
5,405,901 A * 4/1995 Daniell et al. ................. 525/53

FOREIGN PATENT DOCUMENTS

| EP | 59865 | | 9/1982 |
| EP | 282929 | | 9/1988 |
| JP | 5-93014 | | 4/1993 |
| JP | 05-093014 | * | 4/1993 |
| JP | 8-67710 | | 3/1996 |
| JP | 08-067710 | * | 3/1996 |

* cited by examiner

Primary Examiner—Ling-Sui Choi
(74) Attorney, Agent, or Firm—Oblon, Spivak, McClelland, Maier & Neustadt, P.C.

(57) ABSTRACT

An α-olefin polymer having extremely high stereoregularity, exhibiting excellent fluidity and containing a decreased amount of catalyst residues in the polymer can be obtained industrially advantageously in accordance with a process for producing an α-olefin polymer which comprises homopolymerizing an α-olefin or copolymerizing two or more α-olefins in the presence of (A) a solid catalyst component comprising magnesium, titanium and a halogen, (B) an organoaluminum compound having a content of hydroaluminum compounds of 0.1% by weight or smaller and (C) an organozinc compound.

A block copolymer of propylene comprising a homopolymer portion exhibiting high fluidity and a copolymer portion having a high molecular weight can be obtained in accordance with a process for producing a block copolymer of propylene which comprises polymerizing propylene in the presence of (A) a solid catalyst component comprising a titanium compound and an electron-donating agent, (B) an organoaluminum compound and (C) an organozinc compound to produce crystalline polypropylene and copolymerizing propylene and at least one of ethylene and α-olefins having 4 or more carbon atoms in the presence of the produced crystalline polypropylene.

17 Claims, No Drawings

PROCESS FOR PRODUCING α-OLEFIN POLYMER

TECHNICAL FIELD

The present invention relates to a process for producing an α-olefin polymer and, more particularly, to a process for producing an α-olefin polymer which efficiently provides an olefin polymer having extremely high stereoregularity and exhibiting excellent fluidity and a process for producing a block copolymer of propylene and at least one of ethylene and α-olefins having 4 or more carbon atoms.

BACKGROUND ART

Since olefin polymers, in particular polypropylene (hereinafter referred to as PP, occasionally), are crystalline macromolecular compounds, the olefin polymers exhibit excellent rigidity, tensile strength, heat resistance, chemical resistance, optical properties and workability and have low specific gravities. Therefore, the olefin polymers are widely used in various fields such as injection molded articles, containers and packaging materials.

As the catalyst system for polymerizing α-olefins, many catalysts comprising a solid catalyst component, an organoaluminum compound and, where necessary, an electron-donating compound have been disclosed. The solid catalyst component comprises magnesium, titanium, halogen elements and, where necessary, an electron-donating compound. When an α-olefin polymer is produced using such a catalyst, in general, hydrogen is used as the chain transfer agent. However, this process has a drawback in that hydrogen must be added in a great amount in order to obtain an α-olefin polymer exhibiting high fluidity and, as the result, the stereoregularity deteriorates or productivity decreases due to a decrease in the monomer concentration in the polymerization field.

As described above, it is the general practice that the amount of hydrogen as the chain transfer agent during the polymerization is increased to improve fluidity of the polymer from the standpoint of workability. However, since the resistance of a reactor to pressure is limited, the concentration of the monomer which can be placed into the reactor decreases due to the increase in the concentration of hydrogen. This causes a decrease in the efficiency of the catalyst and an economic disadvantage arises.

Thus, the present invention has a first object of providing a process for industrially advantageously producing an α-olefin polymer having extremely high stereoregularity, exhibiting excellent fluidity and containing a decreased amount of catalyst residues in the polymer.

A block copolymer of propylene (hereinafter referred to as block PP, occasionally) is produced, in general, in accordance with a process comprising producing a homopolymer of propylene by polymerization of propylene, followed by producing a copolymer by copolymerization with other momoners. The properties required for block PP are mechanical properties derived from the homopolypropylene and impact resistance in an excellent balance. It is also required that the molding property, appearance and elongation are excellent. It is known that such requirements can be satisfied by a structure having a homopolymer portion exhibiting excellent fluidity and a copolymer portion having a relatively high molecular weight.

To enhance fluidity of the homopolymer portion, in general, the amount of hydrogen used as the chain transfer agent is increased during the polymerization. However, when hydrogen used in the homopolymerization in the first stage affects the condition of the copolymerization in the second stage, in other words, when hydrogen is not removed or is only partially removed between the first stage and the second stage, an increased amount of hydrogen in the stage of the homopolymerization causes a decrease in the molecular weight of the copolymer portion due to an increase in the amount of hydrogen in the reactor used in the copolymerization of the second stage and block PP having the desired impact resistance cannot be obtained. To improve the impact resistance of block PP, it is necessary that hydrogen be removed completely between the first stage and the second stage and the additional facilities be installed for this purpose. Moreover, the inner pressure of polymerization apparatuses increases when the amount of hydrogen is increased during the polymerization. Since the resistance of the polymerization apparatuses to pressure is limited, the amount of hydrogen used during the polymerization is naturally limited. In this case, fluidity of the obtained homopolypropylene is limited and block PP having the desired properties cannot be obtained.

When fluidity of the homopolymer portion in block PP is increased by decomposition of the polymer, the fluidity expected from the melt index (MI) cannot be obtained. Moreover, a problem arises in that physical properties such as impact resistance deteriorate since the molecular weight of the block portion also decreases.

Therefore, development of a process for producing a homopolymer having a high fluidity without a decrease in the molecular weight of the copolymer portion or an increase in the inner pressure of the reactor has been desired.

The present invention has a second object of providing a process for efficiently producing a block polypropylene comprising a homopolymer portion exhibiting a high fluidity and a copolymer portion having a high molecular weight.

DISCLOSURE OF THE INVENTION

As the result of intensive studies by the present inventors to overcome the above problems on the process for producing an α-olefin polymer, with respect to the first object, it was found that an α-olefin polymer could be industrially advantageously produced by using an organozinc compounds as the essential component and an organoaluminum compound having a small content of hydroaluminum compounds.

As the first invention, the following processes for producing an α-olefin polymer are provided.

[1] A process for producing an α-olefin polymer which comprises homopolymerizing an α-olefin or copolymerizing two or more α-olefins in a presence of (A) a solid catalyst component comprising magnesium, titanium and a halogen, (B) an organoaluminum compound having a content of hydroaluminum compounds of 0.1% by weight or smaller and (C) an organozinc compound.

[2] A process for producing an α-olefin polymer described above in [1], wherein the solid catalyst component of component (A) further comprises an electron-donating agent.

[3] A process for producing an α-olefin polymer described above in any of [1] and [2], wherein the organozinc compound of component (C) is an organozinc compound represented by a general formula:

$$ZnR^1R^2$$

wherein $R^1$ and $R^2$ each represent a hydrocarbon group having 1 to 10 carbon atoms and may represent a same group or different groups.

[4] A process for producing an α-olefin polymer described above in any of [1] to [3], wherein the homopolymerization or the copolymerization is conducted in a further presence of (D) an electron-donating compound.

[5] A process for producing an α-olefin polymer described above in any of [1] to [4], wherein the organoaluminum compound has a content of hydroaluminum compounds of 0.01% by weight or smaller.

With respect to the second object, it was found that, when an organozinc compound was present in the catalyst for polymerization of propylene comprising a titanium compound, an electron-donating agent and an organoaluminum compound during the homopolymerization in the first stage, the molecular weight could be reduced to a great degree so that a homopolymer of propylene exhibiting excellent fluidity could be obtained and the molecular weight showed almost no decrease in the copolymerization of the second stage.

In accordance with this process, it is not necessary that the amount of hydrogen is increased and a homopolymer of propylene exhibiting desired fluidity can be produced under a condition of a low partial pressure of hydrogen, for example, in a slurry process in which a polymer of propylene is produced while propylene is dissolved in an inert hydrocarbon solvent or in a gas phase process in which a polymer of propylene is produced by reaction of propylene in the gas phase. When block PP is produced, the decrease in the molecular weight of the copolymer portion in the second stage can be prevented. For example, in a bulk process in which a polymer of propylene is produced in a liquid propylene, the pressure of hydrogen can be decreased and a homopolymer of propylene exhibiting excellent fluidity can be easily produced using a small amount of hydrogen even when the resistance to pressure in the process is limited.

As the second invention, the following processes for producing a block copolymer of propylene are provided.

[1] A process for producing a block copolymer of propylene which comprises polymerizing propylene in a presence of (A) a solid catalyst component comprising a titanium compound and an electron-donating agent, (B) an organoaluminum compound and (C) an organozinc compound to produce crystalline polypropylene and copolymerizing propylene and at least one of ethylene and α-olefins having 4 or more carbon atoms in a presence of the produced crystalline polypropylene.

[2] A process for producing a block copolymer of propylene described above in [1], wherein the solid catalyst component of component (A) further comprises a magnesium compound.

[3] A process for producing a block copolymer of propylene described above in any of [1] and [2], wherein the crystalline polypropylene is produced in a further presence of (D) an electron-donating compound.

[4] A process for producing a block copolymer of propylene described above in [3], wherein the electron-donating compound is an organosilicon compound.

[5] A process for producing a block copolymer of propylene described above in any of [3] and [4], wherein the solid catalyst component of component (A) is obtained by bringing the titanium compound and a magnesium compound into contact with each other in a presence of the electron-donating agent at a temperature of 120 to 150° C. and washing an obtained product with an inert solvent at a temperature of 100 to 150° C.

[6] A process for producing a block copolymer of propylene described above in [5], wherein the solid catalyst component of component (A) is obtained by bringing the titanium compound and the magnesium compound into contact with each other in a presence of the electron-donating agent and a silicon compound at a temperature of 120 to 150° C. and washing an obtained product with an inert solvent at a temperature of 100 to 150° C.

[7] A process for producing a block copolymer of propylene described above in any of [1] to [6], wherein the organozinc compound of component (C) is an organozinc compound represented by a general formula:

$$ZnR^1R^2$$

wherein $R^1$ and $R^2$ each represent a hydrocarbon group having 1 to 10 carbon atoms and may represent a same group or different groups.

[8] A process for producing a block copolymer of propylene described above in any of [1] to [7], wherein (E) an electron-donating substance is added before or during the copolymerization of propylene and at least one of ethylene and α-olefins having 4 or more carbon atoms.

THE MOST PREFERRED EMBODIMENT TO CARRY OUT THE INVENTION

In accordance with the processes for producing an α-olefin polymer of the present invention (the first invention and the second invention), an α-olefin is homopolymerized or copolymerized in the presence of (A) a solid catalyst component, (B) an organoaluminum compound, (C) an organozinc compound and, where necessary, (D) an electron-donating compound.

In the first invention, (a) magnesium, (b) titanium and (c) a halogen atom are used as the essential components for (A) the solid catalyst component and, where necessary, (d) an electron-donating agent is used. An organoaluminum compound having a content of hydroaluminum compounds of 0.1% by weight or smaller is used as (B) the organoaluminum compound.

In the second invention, (b) a titanium compound and (d) an electron-donating agent are used as the essential components for (A) the solid catalyst component and, where necessary, (a) a magnesium compound and (e) a silicon compound are used. Propylene is polymerized in the presence of the above components and a crystalline polypropylene is produced. Then, in the presence of the polypropylene produced above, propylene and at least one of ethylene and α-olefins having 4 or more carbon atoms are copolymerized and a block copolymer of propylene is produced. As (E) an electron-donating substance which is added before or during the copolymerization of propylene and at least one of ethylene and α-olefins having 4 or more carbon atoms, (d) the electron-donating agent or (D) the electron-donating compound is used.

The components of the catalyst for polymerization of olefins in the present invention and the process for preparing the catalyst will be described in the following.

(A) The Solid Catalyst Component (a) Magnesium Compound

It is necessary that component (A) of the first invention comprises magnesium. Therefore, a magnesium compound is used for preparation of component (A).

For component (A) of the second invention, a magnesium compound is used where necessary.

The magnesium compound is not particularly limited. Magnesium compounds represented by general formula (I):

$$MgR^3R^4 \qquad (I)$$

are preferably used.

In general formula (I), $R^3$ and $R^4$ represent a hydrocarbon group, a group represented by $OR^5$, $R^5$ representing a hydrocarbon group, or a halogen atom. Examples of the hydrocarbon group represented by $R^3$ and $R^4$ include alkyl groups having 1 to 12 carbon atoms, cycloalkyl groups, aryl groups and aralkyl groups. Examples of the group represented by $OR^5$ include groups in which $R^5$ represents an alkyl group having 1 to 12 carbon atoms, a cycloalkyl group, an aryl group or an aralkyl group. Examples of the halogen atom include chlorine atom, bromine atom, iodine atom and fluorine atom. $R^3$ and R4 may represent the same group or different groups.

Examples of the magnesium compound represented by general formula (I) include alkylmagnesiums and arylmagnesiums such as dimethylmagnesium, diethylmagnesium, diisopropylmagnesium, dibutylmagnesium, dihexylmagnesium, dioctylmagnesium, ethylbutylmagnesium, diphenylmagnesium and dicyclohexylmagnesium; alkoxymagnesiums and aryloxymagnesiums such as dimethoxymagnesium, diethoxymagnesium, dipropoxymagnesium, dibutoxymagnesium, dihexyloxymagnesium, dioctoxymagnesium, diphenoxymagnesium and dicyclohexyloxymagnesium; alkylmagnesium halides and arylmagnesium halides such as ethylmagnesium chloride, butylmagnesium chloride, hexylmagnesium chloride, isopropylmagnesium chloride, isobutylmagnesium chloride, t-butylmagnesium chloride, phenylmagnesium bromide, benzylmagnesium chloride, ethylmagnesium bromide, butylmagnesium bromide, phenyl-magnesium chloride and butylmagnesium iodide; alkoxymagnesium halides and aryloxymagnesium halides such as butoxymagnesium chloride, cyclohexyloxymagnesium chloride, phenoxymagnesium chloride, ethoxymagnesium bromide, butoxymagnesium bromide and ethoxymagnesium iodide; and magnesium halides such as magnesium chloride, magnesium bromide and magnesium iodide.

Among these magnesium compounds, magnesium halides alkoxy-magnesiums, alkylmagnesiums and alkylmagnesium halides are preferable from the standpoint of the polymerization activity and the stereoregularity.

The above magnesium compounds can be prepared from metallic magnesium or compound containing magnesium.

For example, the above magnesium compound can be prepared by bringing metallic magnesium into contact with a halogen and an alcohol.

Examples of the halogen include iodine, chlorine, bromine and fluorine. Among these halogens, iodine is preferable. Examples of the alcohol include methanol, ethanol, propanol, butanol and cyclohexanol, octanol.

As another example, the above magnesium compound can be prepared by bringing an alkoxymagnesium represented by $Mg(OR^6)_2$, $R^6$ representing a hydrocarbon group having 1 to 20 carbon atoms, into contact with a halide.

Examples of the halide include silicon compounds of component (e) which will be described later, silicon tetrachloride, silicon tetrabromide, tin tetrachloride, tin tetrabromide and hydrogen chloride. Among these compounds, silicon tetrachloride is preferable from the standpoint of the polymerization activity and the stereoregularity. Preferable examples of the hydrocarbon group represented by $R^6$ include alkyl groups such as methyl group, ethyl group, propyl group, isopropyl group, butyl group, isobutyl group, hexyl group and octyl group; cyclohexyl group; alkenyl groups such as allyl group, propenyl group and butenyl group; aryl groups such as phenyl group, tolyl group and xylyl group; and aralkyl groups such as phenetyl group and 3-phenylpropyl group. Among these groups, alkyl groups having 1 to 10 carbon atoms are preferable.

The above magnesium compounds may be supported on a support such as silica, alumina and polystyrene.

The above magnesium compound may be used singly or in combination of two or more and may comprise other elements such as halogens such as iodine, silicon and aluminum or electron-donating agents such as alcohols, ethers and esters.

(b) Titanium Compound

In the first and second inventions, it is necessary that component (A) comprises titanium. Therefore, a titanium compound is used in the preparation of component (A).

The titanium compound is not particularly limited. Titanium compounds represented by general formula (II):

$$TiX^1_p(OR^7)_{4-p} \qquad (II)$$

are preferably used.

In general formula (II), $X^1$ represents a halogen atom, which is preferably chlorine atom or bromine atom and more preferably chlorine atom. $R^7$ represents a hydrocarbon group which may be a saturated group or an unsaturated group, may be a linear group, a branched group or cyclic group and may have hetero atoms such as sulfur, nitrogen, oxygen, silicon and phosphorus. It is preferable that $R^7$ represents a hydrocarbon group having 1 to 10 carbon atoms, more preferably an alkyl group, an alkenyl group, a cycloalkenyl group, an aryl group or an aralkyl group and most preferably a linear or branched alkyl group. When a plurality of groups represented by $OR^7$ are present, the plurality of groups may be the same with or different from each other. Examples of the group represented by $R^7$ include methyl group, ethyl group, n-propyl group, isopropyl group, n-butyl group, sec-butyl group, isobutyl group, n-pentyl group, n-hexyl group, n-heptyl group, n-octyl group, n-decyl group, allyl group, butenyl group, cyclopentyl group, cyclohexyl group, cyclohexenyl group, phenyl group, tolyl group, benzyl group and phenetyl group. p represents an integer of 0 to 4.

Examples of the titanium compound represented by the above general formula (II) include tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium and tetraphenoxytitanium; titanium tetrahalides such as titanium tetrachloride, titanium tetrabromide and titanium tetraiodide; alkoxytitanium trihalides such as methoxytitanium trichloride, ethoxytitanium trichloride, propoxytitanium trichloride, n-butoxytitanium trichloride and ethoxytitanium tribromide; dialkoxytitanium dihalides such as dimethoxytitanium dichloride, diethoxytitanium dichloride, diisopropoxytitanium dichloride, di-n-propoxytitanium dichloride and diethoxytitanium dibromide; and trialkoxytitanium monohalides such as tiimethoxytitanium chloride, triethoxytitanium chloride, triisopropoxytitanium chloride, tri-n-propoxytitanium chloride and tri-n-butoxytitanium chloride. Among these compounds, titanium compounds having a greater number of halogen atoms are preferable and titanium tetrachloride is more preferable from the standpoint of the polymerization activity. The titanium compound may be used singly or in combination of two or more.

(c) Halogen Atom

The halogen contained in the solid catalyst component of component (A) in the first invention is, in general, supplied from the magnesium compound and the titanium compound described above.

(d) Electron-Donating Agent

Examples of the electron-donating agent, which is an optional component in the first invention and the essential component in the second invention, include electron-donating agents containing oxygen such as alcohols, phenols, ketones, aldehydes, carboxylic acids, malonic acid, esters of organic acids and inorganic acids and ethers such as monoethers, diethers and polyethers; and electron-donating agents containing nitrogen such as ammonia, amines, nitriles and isocyanates. Examples of the above organic acid include carboxylic acids and, specifically, malonic acid.

Among the above electron-donating agents, esters of polybasic carboxylic acids and polyethers are preferable. Esters of aromatic polybasic carboxylic acids are more preferable. From the standpoint of the polymerization activity, diesters of aromatic dibasic carboxylic acids are most preferable. As the organic group in the ester portion, a linear, branched or cyclic aliphatic hydrocarbon group is preferable.

Examples of the diester of a dibasic aromatic carboxylic acid include dialkyl esters of dicarboxylic acids. Examples of the dicarboxylic acid include phthalic acid, naphthalene-1,2-dicarboxylic acid, naphthalene-2,3-dicarboxylic acid, 5,6,7,8-tetrahydronaphthalene-1,2-dicarboxylic acid, 5,6,7,8-tetrahydronaphthalene-2,3-dicarboxylic acid, indan-4,5-dicarboxylic acid and indan-5,6-dicarboxylic acid. Examples of the alkyl group in the dialkyl ester portion include methyl group, ethyl group, n-propyl group, isopropyl group, n-butyl group, isobutyl group, t-butyl group, n-pentyl group, 1-methylbutyl group, 2-methylbutyl group, 3-methylbutyl group, 1,1-dimethylpropyl group, 1-methylpentyl group, 2-methylpentyl group, 3-methylpentyl group, 4-methylpentyl group, 1-ethylbutyl group, 2-ethylbutyl group, n-hexyl group, cyclohexyl group, n-heptyl group, n-octyl group, n-nonyl group, 2-methylhexyl group, 3-methylhexyl group, 4-methylhexyl group, 2-ethylhexyl group, 3-ethylhexyl group, 4-ethylhexyl group, 2-methylpentyl group, 3-methylpentyl group, 2-ethylpentyl group and 3-ethylpentyl group.

Among these compounds, diesters of phthalic acid are preferable. It is preferable that the organic group in the ester portion is a linear or branched aliphatic hydrocarbon group having 4 or more carbon atoms from the standpoint of the activity and the stereoregularity. Preferable examples of the diester of phthalic acid include di-n-butyl phthalate, diisobutyl phthalate and di-n-heptyl phthalate.

Examples of the polyether include compounds represented by the following general formula (III):

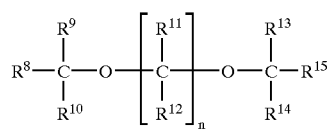

(III)

wherein n represents an integer of 2 to 10, $R^8$ to $R^{15}$ each represent a substituent having at least one element selected from carbon, hydrogen, oxygen, halogens, nitrogen, sulfur, phosphorus, boron and silicon, $R^{11}$ and $R^{12}$ may represent the same substituent or different substituents, any substituents among the substituents represented by $R^8$ to $R^{15}$, preferably substituents represented by $R^{11}$ and $R^{12}$, may from a ring which is not a benzene ring and the main chain may have atoms other than carbon atom. Examples of the polyether compound represented by general formula (III) include 2-(2-ethylhexyl)-1,3-dimethoxypropane, 2-isopropyl-1,3-dimethoxypropane, 2-butyl-1,3-dimethoxypropane, 2-s-butyl-1,3-dimethoxypropane, 2-cyclohexyl-1,3-dimethoxypropane, 2-phenyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(2-fluorophenyl)-1,3-dimethoxypropane, 2-(1-decahydronaphthyl)-1,3-dimethoxypropane, 2-(p-t-butylphenyl)-1,3-dimethoxypropane, 2,2-dicyclohexyl-1,3-dimethoxy-propane, 2,2-dicyclopentyl-1,3-dimethoxypropane, 2,2-diethyl-1,3-dimethoxypropane, 2,2-dipropyl-1,3-dimethoxypropane, 2,2-diisopropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl-2-ethyl-1,3-dimethoxypropane, 2-methyl-2-isopropyl-1,3-dimethoxypropane, 2-methyl-2-phenyl-1,3-dimethoxypropane, 2-methyl-2-cyclohexyl-1,3-dimethoxypropane, 2,2-bis(p-chlorophenyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxy-propane, 2,2-diisobutyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxy-propane, 2-(1-methylbutyl)-2-isopropyl-1,3-dimethoxypropane, 2-(1-methylbutyl)-2-s-butyl-1,3-dimethoxypropane, 2,2-di-s-butyl-1,3-dimethoxypropane, 2,2-di-t-butyl-1,3-dimethoxypropane, 2,2-dineopentyl-1,3-dimethoxypropane, 2-isopropyl-2-isopentyl-1,3-dimethoxypropane, 2-phenyl-2-isopropyl-1,3-dimethoxypropane, 2-phenyl-2-s-butyl-1,3-dimethoxypropane, 2-benzyl-2-isopropyl-1,3-dimethoxypropane, 2-benzyl-2-s-butyl-1,3-dimethoxypropane, 2-phenyl-2-benzyl-1,3-dimethoxypropane, 2-cyclopentyl-2-isopropyl-1,3-dimethoxypropane, 2-cyclopentyl-2-s-butyl-1,3-dimethoxypropane, 2-cyclohexyl-2-isopropyl-1,3-dimethoxypropane, 2-cyclohexyl-2-s-butyl-1,3-dimethoxypropane, 2-isopropyl-2-s-butyl-1,3-dimethoxypropane, 2-cyclohexyl-2-cyclohexylmethyl-1,3-dimethoxy-propane, 2,3-diphenyl-1,4-diethoxybutane, 2,3-dicyclohexyl-1,4-diethoxybutane, 2,2-benzyl-1,4-diethoxybutane, 2,3-dicyclohexyl-1,4-diethoxybutane, 2,3-diisopropyl-1,4-diethoxybutane, 2,2-bis(p-methylphenyl)-1,4-dimethoxybutane, 2,3-bis(p-chlorophenyl)-1,4-dimethoxybutane, 2,3-bis(p-fluorophenyl)-1,4-dimethoxybutane, 2,4-diphenyl-1,5-dimethoxypentane, 2,5-diphenyl-1,5-dimethoxyhexane, 2,4-diisopropyl-1,5-dimethoxypentane, 2,4-diisobutyl-1,5-dimethoxypentane, 2,4-diisoamyl-1,5-dimethoxypentane, 3-methoxymethyltetrahydrofuran, 3-methoxymethyldioxane, 1,3-diisobutoxypropane, 1,2-diisobutoxypropane, 1,2-diisobutoxyethane, 1,3-diisoamyloxypropane, 1,3-diisoneopentyloxy-ethane, 1,3-dineopentyloxypropane, 2,2-tetramethylene-1,3-dimethoxypropane, 2,2-pentamethylene-1,3-dimethoxypropane, 2,2-hexamethylene-1,3-dimethoxypropane, 1,2-bis(methoxymethyl)cyclohexane, 2,8-dioxaspiro[5,5]

undecane, 3,7-dioxaspiro[3,3,1]nonane, 3,7-dioxabicyclo-[3,3,0]octane, 3,3-diisobutyl-1,5-oxononane, 6,6-diisobutyldioxyheptane, 1,1-dimethoxymethylcyclopentane, 1,1-bis(dimethoxymethyl)cyclohexane, 1,1-bis(methoxymethyl)bicyclo[2,2,1]heptane, 1,1-dimethoxymethylcyclo-pentane, 2-methyl-2-methoxymethyl-1,3-dimethoxypropane, 2-cyclohexyl-2-ethoxymethyl-1,3-diethoxypropane, 2-cyclohexyl-2-methoxymethyl-1,3-dimethoxypropane, 2,2-diisobutyl-1,3-dimethoxycyclohexane, 2-isopropyl-2-isoamyl-1,3-dimethoxycyclohexane, 2-cyclohexyl-2-methoxymethyl-1,3-dimethoxycyclohexane, 2-isopropyl-2-methoxymethyl-1,3-dimethoxycyclo-hexane, 2-isobutyl-2-methoxymethyl-1,3-dimethoxycyclohexane, 2-cyclohexyl-2-ethoxymethyl-1,3-diethoxycyclohexane, 2-cyclohexyl-2-ethoxymethyl-1,3-dimethoxycyclohexane, 2-isopropyl-2-ethoxymethyl-1,3-diethoxycyclohexane, 2-isopropyl-2-ethoxymethyl-1,3-dimethoxycyclo-hexane, 2-isobutyl-2-ethoxymethyl-1,3-diethoxycyclohexane, 2-isobutyl-2-ethoxymethyl-1,3-dimethoxycyclohexane, tris(p-methoxyphenyl)phosphine, methylphenylbis(methoxymethyl)silane, diphenylbis(methoxymethyl)-silane, methylcyclohexylbis(methoxymethyl)silane, di-t-butylbis(methoxy-methyl)silane, cyclohexyl-t-butylbis(methoxymethyl)silane and i-propyl-t-butylbis(methoxymethyl)silane.

Among these compounds, 1,3-diethers are preferable and 2,2-diisobutyl-1,3-dimethoxypropane, 2-isopropyl-2-isopentyl-1,3-dimethoxy-propane, 2,2-dicyclohexyl-1,3-dimethoxypropane, 2,2-bis(cyclohexyl-methyl)-1,3-dimethoxypropane, 2-cyclohexyl-2-isopropyl-1,3-dimethoxy-propane, 2-isopropyl-2-s-butyl-1,3-dimethoxypropane, 2,2-diphenyl-1,3-dimethoxypropane and 2-cyclopentyl-2-isopropyl-1,3-dimethoxypropane are more preferable.

The above compounds may be used singly or in combination of two or more.

(e) Silicon Compound

In the present invention, a silicon compound represented by the following general formula (IV):

$$Si(OR^{16})_q X^2_{4-q} \qquad (IV)$$

may be used as component (e) in combination with components (a), (b) and (d) described above in the preparation of the solid catalyst component, where necessary. In the above general formula (IV), $R^{16}$ represents a hydrocarbon group, $X^2$ represents a halogen atom and q represents an integer of 0 to 3. By using the silicon compound, the catalyst activity and the stereoregularity can be improved and the amount of fine powder in the formed polymer can be decreased.

In the above general formula (IV), $X^2$ represents a halogen atom. Chlorine atom and bromine atom are preferable as the halogen atom. $R^{16}$ represents a hydrocarbon group which may be a saturated group or an unsaturated group, may be a linear group, a branched group or a cyclic group and may have heteroatoms such as sulfur atom, nitrogen atom, oxygen atom, silicon atom and phosphorus atom. It is preferable that the above hydrocarbon group is a hydrocarbon group having 1 to 10 carbon atoms and more preferably an alkyl group, an alkenyl group, a cycloalkenyl group, an aryl group or an aralkyl group. When a plurality of the group represented by —$OR^{16}$ are present, the plurality of groups may be the same with or different from each other. Examples of the group represented by $R^{16}$ include methyl group, ethyl group, n-propyl group, isopropyl group, n-butyl group, sec-butyl group, isobutyl group, n-pentyl group, n-hexyl group, n-heptyl group, n-octyl group, n-decyl group, allyl group, butenyl group, cyclopentyl group, cyclohexyl group, cyclohexenyl group, phenyl group, tolyl group, benzyl group and phenetyl group. q represents an integer of 0 to 3.

Examples of the silicon compound represented by the above general formula (IV) include silicon tetrachloride, methoxytrichlorosilane, dimethoxydichlorosilane, trimethoxychlorosilane, ethoxytrichlorosilane, diethoxydichlorosilane, triethoxychlorosilane, propoxytrichlorosilane, dipropoxydichlorosilane and tripropoxychlorosilane. Among these compounds, silicon tetrachloride is preferable. The silicon compound may be used singly or in combination of two or more.

(Preparation of the Solid Catalyst Component)

To prepare (A) the solid catalyst component in the first invention, (a) the magnesium compound, (b) the titanium compound and, where necessary, (d) the electron-donating agent and (e) the silicon compound are brought into contact with each other in accordance with a conventional process.

Examples of the conventional process include processes described in Japanese Patent Application Laid-Open Nos. Showa 53(1978)-43094, Showa 55(1980)-135102, Showa 55(1980)-135103 and Showa 56(1981)-18606. Specific examples include the following processes. (1) The magnesium compound or a complex compound prepared from the magnesium compound and the electron-donating agent is pulverized in the presence of the electron-donating agent and, where desired, an auxiliary pulverizing agent and the resultant product is reacted with the titanium compound. (2) A liquid material of the magnesium compound having no reducing ability and the titanium compound in the liquid state are reacted with each other in the presence of the electron-donating agent and a solid titanium complex compound is precipitated. (3) The product obtained in (1) or (2) described above is reacted with the titanium compound. (4) The product obtained in (1) or (2) described above is reacted with the electron-donating agent and the titanium compound. (5) The magnesium compound or a complex compound prepared from the magnesium compound and the electron-donating agent is pulverized in the presence of the electron-donating agent, the titanium compound and, where desired, an auxiliary pulverizing agent and the product is treated with a halogen or a halogen compound.

Further examples of the process for preparing the solid catalyst component of component (A) include processes described in Japanese Patent Application Laid-Open Nos. Showa 56(1981)-166205, Showa 57(1982)-63309, Showa 57(1982)-190004, Showa 57(1982)-300407 and Showa 58(1982)-47003. The solid catalyst component of component (A) can also be prepared by bringing a solid substance, which contains magnesium supported on an oxide of an element belonging to any of Groups II to IV of the Periodic Table such as silicon oxide and magnesium oxide or on a complex oxide containing at least one of oxides of elements belonging to any of the Groups II to IV of the Periodic Table such as silica alumina, into contact with the electron-donating agent and the titanium compound in a solvent at a temperature in the range of 0 to 200° C. and preferably in the range of 10 to 150° C. for a time in the range of 2 minutes to 24 hours.

The amount of the titanium compound is, in general, in the range of 0.5 to 100 mole and preferably in the range of 1 to 50 mole per 1 mole of magnesium in the above magnesium compound. The amount of the electron-donating agent is, in general, in the range of 0.01 to 10 mole and preferably in the range of 0.05 to 1.0 mole per 1 mole of magnesium in the above magnesium compound. Silicon tetrachloride may further be added as the halide.

The temperature of bringing the components into contact with each other is, in general, in the range of −20 to 200° C. and preferably in the range of 20 to 150° C. The time of contact is, in general, in the range of 1 minute to 24 hours and preferably in the range of 10 minutes to 6 hours. The method for bringing the components into contact with each other is not particularly limited. The components may be brought into contact with each other, for example, in the presence of an inert solvent such as a hydrocarbon or after diluting the components with an inert solvent such as a hydrocarbon. Examples of the inert solvent include aliphatic hydrocarbons such as n-pentane, isopentane, n-hexane, n-heptane, n-octane and isooctane; aromatic hydrocarbons such as benzene, toluene and xylene; and mixtures of these solvents.

It is preferable that the titanium compound is brought into contact with the other components twice or more so that the titanium compound is sufficiently supported on the magnesium compound which plays the role of the catalyst support. The solid catalyst component obtained after the contact may be washed with an inert solvent such as a hydrocarbon. Examples of the inert solvent include the inert solvents described above. The obtained solid product can be kept under a dry condition or in an inert solvent such as a hydrocarbon.

In the second invention, any solid catalyst component comprising (b) the titanium compound and (d) the electron-donating agent can be used as the solid catalyst component of component (A). It is preferable that a solid catalyst component is obtained by bringing (b) the titanium compound and (a) the magnesium compound into contact with each other in the presence of (d) the electron-donating agent at a temperature of 120 to 150° C., followed by washing the product with an inert solvent at a temperature of 100 to 150° C. It is more preferable that the above treatments are conducted in the presence of (e) the silicon compound in combination with (d) the electron-donating agent. The method for bringing the components into contact with each other is not particularly limited. For example, the components may be brought into contact with each other in the presence of an inert solvent such as a hydrocarbon or after diluting the components with an inert solvent such as a hydrocarbon in advance. Examples of the inert solvent include aliphatic hydrocarbons such as n-octane, n-decane and ethylcyclohexane; alicyclic hydrocarbons; and mixtures of these solvents.

The titanium compound is used in an amount, in general, in the range of 0.5 to 100 mole and preferably in the range of 1 to 50 mole per 1 mole of magnesium in the magnesium compound. When the ratio of the amounts by mole is outside the above range, the catalyst activity is occasionally insufficient. The electron-donating agent is used in an amount, in general, in the range of 0.01 to 10 mole and preferably in the range of 0.05 to 1.0 mole per 1 mole of magnesium in the magnesium compound. When the ratio of the amounts by mole is outside the above range, the catalyst activity and the stereoregularity are occasionally insufficient.

The above components are brought into each other at a temperature in the range of 120 to 150° C. and preferably in the range of 125 to 140° C. after the entire components are mixed together. When the temperature is outside the above range, the effect of improving the catalyst activity and the stereoregularity is not sufficiently exhibited, occasionally. The above components are brought into contact with each other for a time, in general, in the range of 1 minute to 24 hours and preferably in the range of 10 minutes to 6 hours. When a solvent is used, the range in the pressure is various depending on the solvent and the temperature of the contact. The pressure is, in general, in the range of 0 to 5 MPaG and preferably in the range of 0 to 1 MPaG. From the standpoint of the uniformity and the efficiency of the contact, it is preferable that the mixture is stirred when the components are brought into contact with each other.

It is preferable that the titanium compound is brought into contact with the other components twice or more so that the titanium compound is sufficiently supported on the magnesium compound which plays the role of the catalyst support.

When a solvent is used in the operation of bringing the components into contact with each other, the solvent is used in an amount, in general, in the range of 5,000 ml or less and preferably in the range of 10 to 1,000 ml per 1 mole of the titanium compound. When the amount of the solvent is outside the above range, the uniformity of the catalyst and the efficiency of the contact occasionally deteriorate.

It is preferable that the solid catalyst component obtained after the components are brought into contact with each other as described above is washed with an inert solvent at a temperature in the range of 100 to 150° C. and preferably in the range of 120 to 140° C. When the temperature of washing is outside the above range, the effect of improving the catalyst activity and the stereoregularity is not sufficiently exhibited, occasionally. Examples of the inert solvent include aliphatic hydrocarbons such as n-octane and n-decane; alicyclic hydrocarbons such as methylcyclohexane and ethylcyclohexane; aromatic hydrocarbons such as toluene and xylene; halogenated hydrocarbons such as tetrachloroethane and chlorofluoro-carbons; and mixtures of these solvents. Among these solvents, aliphatic hydrocarbons are preferable.

The process of washing is not particularly limited. Decantation and filtration are preferable. The amount of the inert solvent, the time of the washing and the number of repeated washing are not particularly limited. In general, the solvent is used in an amount in the range of 100 to 100,000 ml and preferably in the range of 1,000 to 50,000 ml per 1 mole of the magnesium compound and the washing is conducted, in general, for a time in the range of 1 minute to 24 hours and preferably in the range of 10 minutes to 6 hours. When the conditions are outside the above ranges, the washing is occasionally insufficient.

The range of the pressure in the washing is various depending on the solvent and the temperature of the washing. The pressure is, in general, in the range of 0 to 5 MPaG and preferably in the range of 0 to 1 MPaG. It is preferable that the mixture containing the solid catalyst component is stirred during the washing of the solid catalyst component from the standpoint of the uniformity and the efficiency of the washing.

The obtained solid catalyst component can be kept under a dry condition or in an inert solvent such as a hydrocarbon.

(B) Organoaluminum Compound

The organoaluminum compound of component (B) used as the essential component in the first and second inventions is not particularly limited. For example, an aluminum compound having an alkyl group represented by the following general formula (VIII):

$$R^{29}{}_m Al(OR^{30})_n X^3{}_{3-n-m} \qquad (VIII)$$

can be preferably used. In the above general formula, $R^{29}$ and $R^{30}$ each represent an alkyl group having 1 to 8 carbon atoms and preferably 1 to 4 carbon atoms, $X^3$ represents a halogen atom, m represents a number in the range of $0<m\leqq3$, preferably 2 or 3 and most preferably 3 and n represents a number in the range of $0\leqq n<3$ and preferably 0 or 1.

Examples of the organoaluminum compound include trialkylaluminums such as trimethylaluminum, triethylaluminum, triisopropylaluminum, triisobutylaluminum and trioctylaluminum; dialkylaluminum monohalides such as diethylaluminum monochloride, diisopropylaluminum monochloride, diisobutylaluminum monochloride and dioctylaluminum monochloride; and alkylaluminum sesquihalides such as ethylaluminum sesquichloride. Among the above organo-aluminum compounds, trialkylaluminums having a lower alkyl group having 1 to 5 carbon atoms are preferable and trimethylaluminum, triethylaluminum, tripropylaluminum and triisobutylaluminum are more preferable. The organoaluminum compound may be used singly or in combination of two or more.

In the first invention, the content of hydroaluminum compounds in (B) the organoaluminum compound is 0.1% by weight or smaller and preferably 0.01% by weight or smaller. When the content of the hydroaluminum compounds exceeds 0.1% by weight, α-olefin polymers exhibiting excellent fluidity and having a decreased amount of catalyst residues in the polymer cannot be produced industrially advantageously.

(C) Organozinc Compound

As component (C) which is the essential component in the first and second inventions, an organozinc compound represented by the general formula:

$$ZnR^1R^2$$

is preferable. In the general formula, $R^1$ and $R^2$ each represent a hydrocarbon group having 1 to 10 carbon atoms and may represent the same group or different groups, Examples of the hydrocarbon group having 1 to 10 carbon atoms include methyl group, ethyl group, various types of propyl groups, various types of butyl groups, various types of hexyl groups and various types of octyl groups. Examples of the alkylzinc compound include dimethylzinc, diethylzinc, di-n-propylzinc, diisopropylzinc and di-n-butylzinc and diisobutylzinc. Among these alkylzinc compounds, dimethylzinc and diethylzinc are preferable.

(D) Electron-Donating Compound

As the electron-donating compound which is added, where necessary, during the polymerization in the first and second invention, organosilicon compounds having the Si—O—C bond, compounds having nitrogen, compounds having phosphorus and compounds having oxygen can be used. From the standpoint of the polymerization activity and the stereoregularity, it is preferable that the organosilicon compounds having the Si—O—C bond are used among the above compounds.

Examples of the organosilicon compounds having the Si—O—C bond include tetramethoxysilane, tetraethoxysilane, tetrabutoxysilane, tetraisobutoxysilane, trimethylmethoxysilane, trimethylethoxysilane, triethylmethoxysilane, triethylethoxysilane, ethylisopropyldimethoxy-silane, propylisopropyldimethoxysilane, diisopropyldimethoxysilane, diisobutyldimethoxysilane, isopropylisobutyldimethoxysilane, di-t-butyldimethoxysilane, t-butylmethyldimethoxysilane, t-butylethyl-dimethoxysilane, t-butylpropyldimethoxysilane, t-butylisopropyldimethoxysilane, t-butylbutyldimethoxysilane, t-butylisobutyldimethoxy-silane, t-butyl(s-butyl)dimethoxysilane, t-butylamyldimethoxysilane, t-butylhexyldimethoxysilane, t-butylheptyldimethoxysilane, t-butyloctyl-dimethoxysilane, t-butylnonyldimethoxysilane, t-butyldecyldimethoxy-silane, t-butyl(3,3,3-trifluoromethylpropyl)dimethoxysilane, cyclohexylmethyldimethoxysilane, cyclohexylethyldimethoxysilane, cyclohexyl-propyldimethoxysilane, cyclopentyl-t-butyldimethoxysilane, cyclohexyl-t-butyldimethoxysilane, dicyclopentyldimethoxysilane, dicyclohexyldimethoxysilane, bis(2-methylcyclopentyl)dimethoxysilane, bis(2,3-dimethylcyclopentyl)dimethoxysilane, diphenyldimethoxysilane, phenyltriethoxysilane, methyltrimethoxysilane, ethyltrimethoxysilane, propyl-trimethoxysilane, isopropyltrimethoxysilane, butyltrimethoxysilane, isobutyltrimethoxysilane, t-butyltrimethoxysilane, s-butyltrimethoxy-silane, amyltrimethoxysilane, isoamyltrimethoxysilane, cyclopentyl-trimethoxysilane, cyclohexyltrimethoxysilane, norbornanetrimethoxy-silane, indenyltrimethoxysilane, 2-methylcyclopentyltrimethoxysilane, cyclopentyl(t-butoxy)dimethoxysilane, isopropyl(t-butoxy)dimethoxysilane, t-butyl(isobutoxy)dimethoxysilane, t-butyl(t-butoxy)dimethoxysilane, thexyltriemthoxysilane, thexylisopropoxydimethoxysilane, thexyl(t-butoxy)dimethoxysilane, thexylmethyldimethoxysilane, thexylethyl-dimethoxysilane, thexylisopropyldimethoxysilane, thexylcyclopentyldimethoxysilane, thexylmyristyldimethoxysilane and thexylcyclohexyl-dimethoxysilane.

The above organosilicon compound may be used singly or in combination of two or more.

Silicon compounds represented by the following general formula (V):

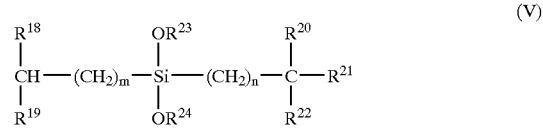

can also be used. In the above general formula, $R^{18}$ to $R^{20}$ each represent hydrogen atom or a hydrocarbon group and may represent the same group or different groups, adjacent groups represented by any of $R^{18}$ to $R^{20}$ may be bonded to each other and form a ring, $R^{21}$ and $R^{22}$ each represent a hydrocarbon group and may represent the same group or different groups, adjacent groups represented by $R^{21}$ and $R^{22}$ may be bonded to each other and form a ring, $R^{23}$ and $R^{24}$ each represent an alkyl group having 1 to 20 carbon atoms and may represent the same group or different groups, m represents an integer of 2 or greater and n represents an integer of 2 or greater.

Examples of the atom and the group represented by $R^{18}$ to $R^{20}$ in general formula (V) include hydrogen atom; linear hydrocarbon groups such as methyl group, ethyl group and n-propyl group; branched hydrocarbon groups such as isopropyl group, isobutyl group, t-butyl group and thexyl group; saturated cyclic hydrocarbon groups such as cyclobutyl group, cyclopentyl group and cyclohexyl group; and unsaturated cyclic hydrocarbon groups such as phenyl group and pentamethylphenyl group. Among these groups, hydrogen atom and linear hydrocarbon groups having 1 to 6 carbon atoms are preferable and hydrogen atom, methyl group and ethyl group are more preferable.

Examples of the group represented by $R^{21}$ and $R^{22}$ include linear hydrocarbon groups such as methyl group, ethyl group and n-propyl group; branched hydrocarbon groups such as isopropyl group, isobutyl group, t-butyl group and thexyl group; saturated cyclic hydrocarbon groups such as cyclobutyl group, cyclopentyl group and cyclohexyl group; and unsaturated cyclic hydrocarbon groups such as phenyl group and pentamethylphenyl group. The groups represented by $R^{21}$ and $R^{22}$ may be the same with or different from each other. Among these groups, hydrogen atom and linear hydrocarbon groups having 1 to 6 carbon atoms are preferable and hydrogen atom, methyl group and ethyl group are more preferable.

Examples of the group represented by $R^{23}$ and $R^{24}$ include linear or branched alkyl groups such as methyl group, ethyl group, n-propyl group, isopropyl group, n-butyl group, isobutyl group, sec-butyl group, t-butyl group, n-pentyl group, n-hexyl group and n-octyl group. The groups represented by $R^{23}$ and $R^{24}$ may be the same with or different from each other. Among these groups, linear hydrocarbon groups having 1 to 6 carbon atoms are preferable and methyl group is more preferable.

Examples of the silicon compound represented by general formula (V) include neopentyl-n-propyldimethoxysilane, neopentyl-n-butyldimethoxysilane, neopentyl-n-pentyldimethoxysilane, neopentyl-n-hexyldimethoxysilane, neopentyl-n-hexyldimethoxysilane, isobutyl-n-propyldimethoxysilane, isobutyl-n-butyldimethoxysilane, isobutyl-n-pentyldimethoxysilane, isobutyl-n-hexydimethoxysilane, isobutyl-n-heptyldimethoxysilane, 2-cyclohexylpropyl-n-propyldimethoxysilane, 2-cyclohexylbutyl-n-propyldimethoxysilane, 2-cyclohexylpentyl-n-propyl-dimethoxysilane, 2-cyclohexylhexyl-n-propyldimethoxysilane, 2-cyclohexylheptyl-n-propyldimethoxysilane, 2-cyclopentylpropyl-n-propy-1dimethoxysilane, 2-cyclopentylbutyl-n-propyldimethoxysilane, 2-cyclopentylpentyl-n-propyldimethoxysilane, 2-cyclopentylhexyl-n-propyl-dimethoxysilane, 2-cyclopentylheptyl-n-propyldimethoxysilane, isopentyl-n-propyldimethoxysilane, isopentyl-n-butyldimethoxysilane, isopentyl-n-pentyldimethoxysilane, isopentyl-hexyldimethoxysilane, isopentyl-n-hexyldimethoxysilane, isopentyl-n-heptyldimethoxysilane, isopentyl-isobutyldimethoxysilane, isopentylneopentyldimethoxysilane, diisopentyl-dimethoxysilane, diisoheptyldimethoxysilane, diisohexyldimethoxysilane and dicyclopentyldimethoxysilane. Preferable examples of the compound include neopentyl-n-propyldimethoxysilane, neopentyl-n-pentyldimethoxysilane, isopentylneopentyldimethoxysilane, diisopentyl-dimethoxysilane, diisoheptyldimethoxysilane, diisohexyldimethoxysilane and dicyclopentyldimethoxysilane. More preferable examples of the compound include neopentyl-n-pentyldimethoxysilane, diisopentyl-dimethoxysilane and dicyclopentyldimethoxysilane.

The silicon compound represented by general formula (V) can be synthesized in accordance with any desired process. A typical route of synthesis is shown in the following:

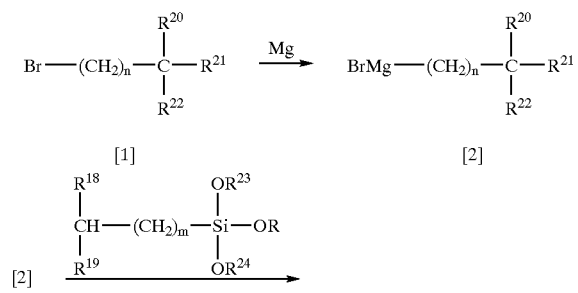

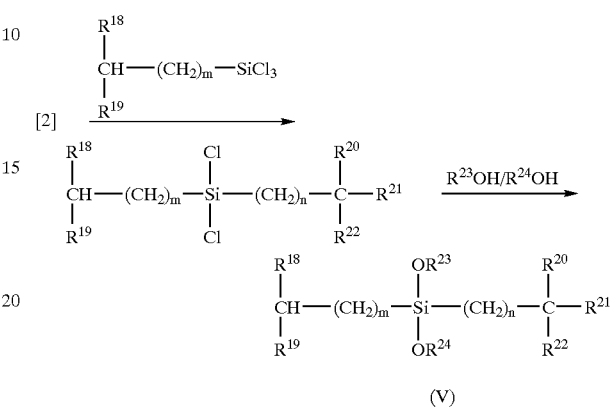

In this route of synthesis, material compound [1] is commercially available or can be obtained in accordance with a conventional process of alkylation or halogenation. The organosilicon compound represented by general formula (V) can be obtained in accordance with the known process of the Grignard reaction with compound [1].

The above organosilicon compound may be used singly or in combination of two or more.

Examples of the compound having nitrogen include 2,6-disubstituted piperidines such as 2,6-diisopropylpiperidine, 2,6-diispropyl-4-methylpiperidine and N-methyl-2,2,6,6-tetramethylpiperidine; 2,5-disubstituted azolidines such as 2,5-diisopropylazolidine and N-methyl-2,2,5,5-tetramethylazolidine; substituted methylenediamines such as N,N,N',N'-tetramethylmethylenediamine and N,N,N',N'-tetraethyl-methylenediamine; and substituted imdazolidines such as 1,3-dibenzyl-imidazolidine and 1,3-dibenzyl-2-phenylimidazolidine.

Examples of the compound having phosphorus include esters of phosphorous acid such as triethylphosphite, tri-n-propoylphosphite, triisopropylphosphite, tri-n-butylphosphite, triisobutylphosphite, diethyl-n-butylphosphite and diethylphenylphosphite.

Examples of the compound having oxygen include 2,6-disubstituted tetrahydrofurans such as 2,2,6,6-tetramethyltetrahydrofuran and 2,2,6,6-tetraethyltetrahydrofuran; dimethoxymethane derivatives such as 1,1-dimethoxy-2,3,4,5-tetrachloropentadiene and 9,9-dimethoxyfluorene and diphenyldimethoxymethane; and polyethers described in the above for (d) the electron-donating agent.

As the organosilicon compound used where necessary in the second invention, for example, organosilicon compounds of the electron-donating compound represented by the following general formula (VI):

$$Si(OR^{25})_q R^{26}_{4-q} \tag{VI}$$

can be used. In the above general formula (VI), $R^{25}$ and $R^{26}$ each represent a hydrocarbon group and may represent the same group or different groups and q represents an integer of 0 to 3.

In the above general formula (VI), $R^{25}$ and $R^{26}$ each represent a hydrocarbon group and may represent the same group or different groups, as described above. The hydrocarbon group may be a saturated group or an unsaturated group, may be a linear group, a branched group or a cyclic group and may have a hetero atom such as sulfur, nitrogen, oxygen, silicon and phosphorus. It is preferable that the hydrocarbon group is a hydrocarbon having 1 to 10 carbon atoms and more preferably an alkyl group, an alkenyl group, a cycloalkenyl group, an aryl group or an aralkyl group. When a plurality of groups represented by —OR$^{25}$ are present, the plurality of groups may be the same with or different from each other. Examples of the group represented by R$^{25}$ and R$^{26}$ include methyl group, ethyl group, n-propyl group, isopropyl group, n-butyl group, sec-butyl group, isobutyl group, n-pentyl group, n-hexyl group, n-heptyl group, n-octyl group, n-decyl group, allyl group, butenyl group, cyclopentyl group, cyclohexyl group, cyclohexenyl group, phenyl group, tolyl group, benzyl group and phenetyl group. q represents an integer of 0 to 3.

Examples of the organosilicon compound represented by general formula (VI) include the compounds described as the examples of the organosilicon compound having Si—O—C bond.

(Process for Producing an α-Olefin Polymer)

The amount of the catalyst used in the first invention is not particularly limited. In general, the solid catalyst component of component (A) is used in an amount such that the amount of the titanium atom is in the range of 0.00005 to 1 mmole per 1 liter of the reaction volume. The organoaluminum compound of component (B) is used in such an amount that the ratio of the amounts by atom of aluminum to titanium is, in general, in the range of 1 to 5,000 and preferably in the range of 10 to 500. When the ratio of the amounts by atom is outside the above range, the catalyst activity is occasionally insufficient. When the electron-donating compound such as the organosilicon compound of component (D) is used, the electron-donating compound is used in such an amount that the ratio of the amounts by mole of (D) the electron-donating compound to (B) the organoaluminum compound is, in general, in the range of 0.001 to 5.0, preferably in the range of 0.01 to 2.0 and more preferably in the range of 0.05 to 1.0. When the ratio of the amounts by mole is outside the above range, sufficient catalyst activity and stereoregularity are not obtained, occasionally.

In the first invention, an α-olefin represented by general formula (VII):

$$R^{27}-CH=CH_2 \quad\quad\quad (VII)$$

is used.

In the above general formula (VII), R$^{27}$ represents hydrogen atom or a hydrocarbon group which may be a saturated group or an unsaturated group. Examples of the α-olefin include ethylene, propylene, 1-butene, 1-pentene, 1-hexene, 1-heptene, 1-octene, 1-decene, 3-methyl-1-pentene, 4-methyl-1-pentene, vinylcyclohexane, butadiene, isoprene and piperylene. The α-olefin may be used singly or in combination of two or more. Among the above α-olefins, ethylene and propylene are preferable.

In the first invention, the polymerization is conducted in the presence of (A) the above solid catalyst component, (B) the above organoaluminum compound, (C) the above organozinc compound and, where necessary, (D) the above electron-donating compound. The polymerization may be conducted in the gas phase or in the liquid phase. The polymerization may also be conducted by bringing the monomer component into contact with the above catalyst components while the catalyst components are suspended in a slurry in an inert solvent such as n-butane, n-pentane, isopentane, n-hexane, n-heptane, n-octane, cyclohexane, toluene and xylene or by bringing the monomer into contact with the catalyst components in the gas phase. The polymerization may also be conducted in the liquid propylene.

The amount of (C) the organozinc compound is not particularly limited as long as the effect of the present invention can be exhibited.

In the first invention, where desired, the olefin may be preliminarily polymerized and the major polymerization is conducted thereafter so that the desired polymerization activity, stereoregularity and form of the polymer powder can be obtained. When the preliminary polymerization is conducted, the olefin is preliminarily polymerized, in general, at a temperature of 100° C. or lower and preferably in the range of −10 to 80° C. at a pressure in the range of the ordinary pressure to about 5 MPaG in the presence of a catalyst prepared by mixing (A) the above solid catalyst component, (B) the above organoaluminum compound and, where necessary, (C) the above organozinc compound and/or (D) the above electron-donating compound in specific relative amounts in an inert solvent such as n-butane, n-pentane, isopentane, n-hexane, n-heptane, n-octane, cyclohexane, toluene and xylene and a product of preliminary polymerization (hereinafter, referred to as a preliminary polymerized catalyst, occasionally) is obtained. Hydrogen may be present or absent in the preliminary polymerization. It is preferable that the amount of the preliminarily polymerized olefin is 0.01 to 5,000 g and more preferably 0.05 to 1,000 g per 1 g of (A) the above solid catalyst component.

Examples of the olefin used for the preliminary polymerization include olefins described as the examples of the α-olefin represented by general formula (VII). The olefin may be used singly or in combination of two or more. Among the above olefins, ethylene and propylene are preferable.

When the preliminary polymerization is conducted, the components described above are mixed together. The preliminary polymerization may be conducted by introducing the olefin directly after mixing the components or after mixing the components and aging the resultant mixture for 0.2 to 3 hours.

It is preferable that the major polymerization of the olefin is conducted in the presence of the preliminarily polymerized catalyst, component (B), component (C) and component (D) since the polymerization activity and the stereoregularity are improved and an olefin polymer exhibiting excellent fluidity can be obtained. The amounts of the preliminary polymerized catalyst obtained as described above, component (B), component (C) and component (D) used in the major polymerization are as follows. The preliminarily polymerized catalyst is used in an amount such that the amount of titanium atom in the preliminarily polymerized catalyst is, in general, in the range of 0.00005 to 1 mmole per 1 liter of the volume of the reaction mixture. The organoaluminum compound of component (B) is used in an amount such that the ratio of the amounts by atom of aluminum to titanium is, in general, in the range of 1 to 5,000 and preferably in the range of 1 to 300. When the electron-donating compound such as the organosilicon compound is used as component (D), the electron-donating compound is used in an amount such that the ratio of the amounts by mole of (D) the electron-donating compound to (B) the organoaluminum compound is, in general, in the range of 0.001 to 5.0 and preferably in the range of 0.01 to 2.0. When the ratio of the amounts by mole is outside the above range, sufficient catalyst activity and stereoregularity are not obtained, occasionally.

Component (C) is used in an amount such that the ratio of the amounts by atom of zinc to titanium is, in general, in the range of 1 to 1,000 and preferably 10 to 500. When the ratio of the amounts by atom is outside the above range, the catalyst activity is occasionally insufficient.

The form of the major polymerization is not particularly limited and any of the solution polymerization, the slurry polymerization, the gas phase polymerization and the bulk polymerization may be conducted. Any of the batch polymerization and the continuous polymerization may be conducted. The polymerization may also be conducted in accordance with a two-stage polymerization or a multi-stage polymerization under conditions different between the stages.

The reaction conditions are as follows. The pressure of the polymerization is not particularly limited. The pressure is suitably selected, in general, in the range of the atmospheric pressure to 8 MPaG and preferably in the range of 0.2 to 5 MPaG from the standpoint of the polymerization activity. The temperature is suitably selected, in general, in the range of 0 to 200° C., preferably in the range of 20 to 150° C. and more preferably in the range of 40 to 100° C. The time of polymerization cannot be generally decided since the time is various depending on the temperature of polymerization of the olefin used as the material. The time of polymerization is, in general, in the range of 5 minutes to 20 hours and preferably in the range of 10 minutes to 10 hours.

The molecular weight can be adjusted by adding a chain transfer agent such as hydrogen gas. An inert gas such as nitrogen gas may be present.

In the first invention, the polymerization can be conducted by using the components in various orders. For example, component (A), component (B) and component (D) are mixed in specific relative amounts and the components are brought into contact with each other. The preliminary polymerization may be conducted, where desired, and component (C) is brought into contact with the above mixture or with the obtained preliminarily polymerized catalyst. Propylene is introduced directly after the addition of component (C) and the major polymerization is conducted. Alternatively, after component (A), component (B) and component (D) are brought into contact with each other, the mixture is aged for 0.2 to 3 hours. The preliminary polymerization may be conducted, where desired, and component (C) is brought into contact with the above mixture or with the preliminarily polymerized catalyst. Propylene is introduced after the addition of component (C) and the major polymerization is conducted. The above catalyst components may be supplied after being suspended in an inert solvent or in the olefin used as the raw material In the first invention, the after-treatment of the polymerization can be conducted in accordance with a conventional process. In the gas phase polymerization, the polymer powder released from the polymerization reactor may be treated with nitrogen gas passing through the powder to remove the olefin and the like remaining in the powder or, where desired, may be pelletized by an extruder. A small amount of water or an alcohol may be added during the above treatments so that the catalyst is completely inactivated. In the bulk polymerization, after the polymerization is completed, the monomer is completely separated from the polymer released from the polymerization reactor and the polymer is pelletized.

Typical examples of the polymer of olefins obtained in accordance with the first invention include polymers of propylene. The polymer of propylene may be a homopolymer of propylene or a copolymer of propylene with ethylene and/or an α-olefin having 4 or more carbon atoms. The copolymer of propylene may be a random copolymer or a block copolymer. Examples of the homopolymer of propylene include homopolymers of propylene having extremely high stereoregularity such as a fraction of the (mmmm) pentad exceeding 95% by mole as measured in accordance with $^{13}$C-NMR and exhibiting high fluidity such as a melt flow rate, in general, in the range of 20 to 1,000 g/10 minutes and preferably in the range of 50 to 500 g/10 minutes as measured in accordance with the method of ASTM D1238 under the condition of the temperature of 230° C. and the load of 21.18 N.

(Process for Producing a Block Copolymer of Propylene)

In the second invention, it is preferable that a preliminarily polymerized catalyst is prepared and then the major polymerization is conducted from the standpoint of the polymerization activity, the stereoregularity and the form of powder of the polymer. The preliminarily polymerized catalyst can be prepared by bringing (A) the above solid catalyst component, (B) the above organoaluminum and, preferably, (D) the above electron-donating compound into contact with an olefin such as propylene, ethylene, 1-butene and 1-hexene. The olefin may be used singly or in combination of two or more. It is preferable that the preliminary polymerization is conducted in an inert solvent such as n-butane, n-pentane, isopentane, n-hexane, n-heptane, n-octane, cyclohexane, toluene and xylene. It is preferable that the preliminary polymerization is conducted at a temperature, in general, in the range of 80° C. or lower, preferably in the range of −10 to 60° C. and more preferably in the range of 0 to 50° C. at a pressure in the range of the atmospheric pressure to about 5 MPaG. The amount of the preliminarily polymerized olefin is preferably 0.05 to 50 g and more preferably 0.1 to 10 g per 1 g of (A) the above solid catalyst component.

When the preliminary polymerization is conducted, component (A), component (B) and component (D) may be mixed in specific relative amounts and brought into contact with each other. The preliminary polymerization may be conducted by introducing the olefin directly after mixing component (A), component (B) and component (D) or after mixing component (A), component (B) and component (D) and aging the resultant mixture for 0.2 to 3 hours.

In the first stage, propylene is homopolymerized in the presence of the preliminarily polymerized catalyst obtained above, (B) the organoaluminum compound, (C) the organozinc compound and, preferably, (D) the electron-donating compound. In the second stage, a comonomer component is introduced so that the copolymerization of propylene with the comonomer takes place. Block PP can be obtained in this manner. In the homopolymerization of the first stage, a homopolymer of propylene exhibiting fluidity such as a melt flow rate in the range of 20 to 1,000 g/10 minutes and preferably in the range of 50 to 500 g/10 minutes as measured in accordance with the method of ASTM D1238 at the temperature of 230° C. under the load of 21.2 N (2.16 kgf) can be obtained.

The comonomer is at least one of ethylene and α-olefins having 4 or more carbon atoms. Examples of the α-olefin having 4 or more carbon atoms include 1-butene, 1-pentene, 1-hexene, 1-heptene, 1-octene, 1-decene, 3-methyl-1-pentene, 4-methyl-1-pentene, 1-dodecene, 1-tetradecene, 1-hexadecene, 1-octadecene and 1-eicosene. The α-olefin may be used singly or in combination of two or more.

In the second invention, it is preferable that the homopolymer portion (the homopolymer of propylene) has an intrinsic viscosity in the range of 0.5 to 1.5 dl/g and more preferably in the range of 0.5 to 1.2 dl/g as measured in decalin at 135° C. so that sufficient fluidity can be obtained. It is preferable that the copolymer portion has an intrinsic viscosity in the range of 1.0 to 10 dl/g and more preferably in the range of 1.5 to 10 dl/g so that sufficient impact strength is maintained.

The homopolymerization of propylene may be conducted in separate several stages in accordance with the object. When the condition is changed in the copolymerization, degassing is conducted where necessary and the relative amounts of the components and the amount of hydrogen can be changed. It is preferable that (E) an electron-donating substance is added in the production of block PP since a decrease in the molecular weight by addition of the organozinc compound can be substantially prevented by adding the electron-donating substance before or during the copolymerization with the comonomer. As (E) the electron-donating substance, the compounds described as the examples of (b) the electron-donating agent and (D) the electron-donating compound can be used. Among these compounds, alcohols are preferable and ethanol is more preferable. In this case, it is preferable that the amount of (E) the electron-donating substance is in the range of about 0.01 to 1.5 mole per 1 mole of the total of (B) the organoaluminum compound and (C) the organozinc compound which are used in the homopolymerization of propylene. When the amount of the electron-donating substance exceeds 1.5 mole, the activity of the catalyst exceedingly decreases, occasionally.

The polymerization can be conducted in the gas phase or in the liquid phase. The polymerization may also be conducted by bringing the monomer component into contact with the preliminarily polymerized catalyst while the catalyst is suspended as a slurry in an inert solvent such as n-butane, n-pentane, isopentane, n-hexane, n-heptane, n-octane, cyclohexane, toluene and xylene or by bringing the monomer into contact with the catalyst in the gas phase. The polymerization may also be conducted in the liquid propylene. Any of the batch polymerization and the continuous polymerization may be conducted. The polymerization may also be conducted in accordance with a two-stage polymerization or a multi-stage polymerization under conditions different between the stages.

The amounts of the catalyst components used in the second invention are not particularly limited. The solid catalyst component of component (A) is used in an amount such that the amount of titanium atom is, in general, 0.00005 to 1 mmole per 1 liter of the volume of the reaction mixture. The organoaluminum compound of component (B) is used in an amount such that the ratio of the amounts by atom of aluminum to titanium is, in general, in the range of 1 to 1,000 and preferably in the range of 10 to 500. When the ratio of the amounts is outside the above range, the catalyst activity becomes occasionally insufficient. The organozinc compound of component (C) is used in an amount such that the ratio of the amounts by atom of aluminum to zinc is, in general, in the range of 1 to 10,000, preferably in the range of 1 to 1,000 and more preferably in the range of 1 to 500. When the ratio of the amounts by atom is smaller than 1, the effect of component (C) is not exhibited, occasionally. When the ratio of the amounts by atom exceeds 10,000, the catalyst activity is occasionally insufficient. (D) The electron-donating compound is used in an amount such that the ratio of the amounts by mole of (D) the electron-donating compound to (B) the organoaluminum compound is, in general, in the range of 0.001 to 5.0, preferably in the range of 0.01 to 2.0 and more preferably in the range of 0.05 to 1.0. When the ratio of the amounts by mole is outside the above range, sufficient catalyst activity and stereoregularity are not obtained, occasionally. However, the ratio of the amounts by mole of component (D) to component (B) can be further decreased when the preliminary polymerization is conducted.

The reaction conditions are as follows. The pressure is not particularly limited. From the standpoint of the polymerization activity, the pressure is suitably selected, in general, in the range of the atmospheric pressure to 10 MPaG and the polymerization temperature is suitably selected, in general, in the range of −80 to 180° C. and preferably in the range of 20 to 150° C.

In the second invention, the after-treatment of the polymerization can be conducted in accordance with a conventional process. In the gas phase polymerization, the polymer powder released from the polymerization reactor may be treated with nitrogen gas passing through the powder to remove the olefin and the like remaining in the powder or, where desired, may be pelletized by an extruder. A small amount of water or an alcohol may be added during the above treatments so that the catalyst is completely inactivated. In the bulk polymerization, after the polymerization is completed, the monomer is completely separated from the polymer released from the polymerization reactor and the polymer is pelletized.

EXAMPLES

The present invention will be described more specifically with reference to examples in the following. However, the present invention is not limited to the examples.

In Examples 1 to 6 and Comparative Examples 1 to 3 which are examples of the first invention, the physical properties and the analytical values were obtained in accordance with the following methods.

(1) Intrinsic viscosity ($\eta$): A polymer was dissolved into decalin and the intrinsic viscosity was measured at 135° C.

(2) Melt flow rate (MFR): The melt flow rate was measured in accordance with the method of ASTM D1238 at 230° C. under a load of 21.18 N.

(3) Stereoregularity (the fraction of the (mmmm) pentad): A polymer was dissolved in a mixed solvent containing 1,2,4-trichlorobenzene and heavy benzene in a ratio of the amounts by volume of 90:10. The signal of methyl group was obtained in accordance with the method of complete decoupling of proton at 130° C. using a $^{13}$C-NMR apparatus (manufactured by NIPPON DENSHI Co., Ltd.; LA-500) and the fraction of the (mmmm) pentad was obtained from the obtained value. The fraction of the isotactic (mmmm) pentad used in the present invention means the fraction of the isotactic pentad in the pentad units in the molecular chain of polypropylene obtained from the $^{13}$C nuclear magnetic resonance spectrum, which was proposed by A. Zambelli et al. in "Macromolecules, 6, 925 (1973)". For the assignment of the peaks in the obtained $^{13}$C nuclear magnetic resonance spectrum, the assignment proposed by A. Zambelli et al. in "Macromolecules, 8, 687 (1975)" was used.

(4) Content of aluminum hydride in an organoaluminum compound: An organoaluminum compound was hydrolyzed and the formed gas was analyzed in accordance with the gas chromatography.

In the examples of the first invention, the following three organoaluminum compounds were used.

| Triethylaluminum A: | the content of aluminum hydride was 0.6% by weight. |
| --- | --- |
| Triethylaluminum B: | the content of aluminum hydride was 0.05% by weight. |
| Triethylaluminum C: | the content of aluminum hydride was 0.004% by weight. |

The content of aluminum hydride was adjusted by distilling commercial triethylaluminum and, where necessary, mixing triethylaluminum obtained after the distillation with that before the distillation.

In Examples 7 to 11 and Comparative Examples 4 and 5 which are examples of the second invention, the intrinsic viscosity [η], the content of the fraction soluble in p-xylene and the content of ethylene in the fraction soluble in p-xylene were obtained in accordance with the following methods.

(1) Intrinsic viscosity [η]: A homopolymer portion or a fraction soluble in p-xylene was dissolved in decalin and the intrinsic viscosity was measured at 135° C.

(2) The content of the fraction soluble in p-xylene: The amount of the fraction soluble in p-xylene at 25° C. was obtained in accordance with the following method.

A sample of a block copolymer of propylene and ethylene in an amount of 5±0.05 g was accurately weighed and placed into a 1,000 ml eggplant-shape flask. After 1±0.05 g of BHT (an antioxidant) was added into the flask, a stirrer and 700±10 ml of p-xylene were placed into the flask and a condenser was attached to the eggplant-shape flask. The flask was heated for 120±30 minutes in an oil bath at 140±5° C. while the stirrer was rotated and the sample was dissolved in p-xylene. The content of the flask was poured into a 1,000 ml beaker and cooled under stirring by the stirrer while the beaker was left standing. After the content of the beaker was stirred until the temperature reached the room temperature (25° C.) (8 hours or longer), the precipitates were removed with a metal net. The filtrate was filtered again with a filter paper and poured into 2,000 ml of methanol placed in a 3,000 ml beaker. The obtained liquid was left standing under stirring by a stirrer for 2 hours or longer. The precipitates were separated with a metal net, dried in the air for 5 hours or longer and then dried in a vacuum drier at 100±5° C. for 240 to 270 minutes and the fraction soluble in p-xylene was recovered.

When the amount by weight of the sample is expressed by A g and the amount of the recovered fraction soluble in p-xylene is expressed by C g, the content of the fraction soluble in p-xylene in the sample is calculated as: W (% by weight)=100×C/A.

(3) Content of ethylene unit in the fraction soluble in p-xylene: The content of the ethylene unit in the fraction soluble in p-xylene was measured in accordance with $^{13}$C-NMR as follows:

The fraction soluble in p-xylene was examined in accordance with $^{13}$C-NMR and the intensities by area of I(Tδδ), I(Tβδ), I(Sγδ), I(Sδδ), I(Tββ), I(Sβδ) and I(Sββ) of the peaks assigned to carbons of Tδδ, Tβδ, Sγδ, Sδδ, Tββ, Sβδ and Sββ, respectively, were obtained. Using the obtained intensities by area, fractions of $f_{EEE}$, $f_{EPE}$, $f_{PPE}$, $f_{PPP}$, $f_{PEE}$ and $f_{PEP}$ of the triads EEE, EPE, PPE, PPP, PEE and PEP, respectively, were calculated in accordance with the following equations:

$f_{EEE}=[I(S\delta\delta)/2+I(S\gamma\delta)/4]/T$ $f_{EPE}=I(T\delta\delta)/T$ $f_{PPE}=I(T\beta\delta)/T$ $f_{PPP}=I(T\beta\beta)/T$ $f_{PEE}=I(S\beta\delta)/T$ $f_{PEP}=I(S\beta\beta)/T$ wherein $T=I(S\delta\delta)/2+I(S\gamma\delta)/4+I(T\delta\delta)+I(T\beta\delta)+I(T\beta\beta)+I(S\beta\delta)+I(S\beta\beta)$.

The content of the ethylene unit (% by mole) was calculated from the fractions obtained above in accordance with the following equation:

Content of ethylene unit (% by mole) =
$$100\{f_{EEE}+2(f_{PEE}+f_{EPE})/3+(f_{PEP}+f_{PEE})/3\}$$

The content of the ethylene unit (% by weight) was calculated in accordance with the following equation:

Content of ethylene unit (% by weight) = $[28Et$ (% by mole)/
$$\{28Et \text{ (\% by mole)}+42(100-Et \text{ (\% by mole)})\}]\times 100$$

wherein the content of the ethylene unit (% by mole) is expressed by Et(% by mole).

For the measurement of $^{13}$C-NMR, the fraction soluble in p-xylene was dissolved in a mixed solvent containing 1,2,4-trichlorobenzene and heavy benzene in a ratio of the amounts by volume of 90:10 and the measurement was conducted in accordance with the method of complete decoupling of proton at 130° C. using a $^{13}$C-NMR apparatus (manufactured by NIPPON DENSHI Co., Ltd.; LA-500).

Example 1

(1) Preparation of a Solid Catalyst Component

After a three-necked flask having an inner volume of 0.5 liters and equipped with a stirrer was purged with nitrogen, 60 ml of dehydrated n-octane and 16 g of diethoxymagnesium were placed into the flask. The resultant mixture was heated at 40° C. and 2.4 ml of silicon tetrachloride was added. After the resultant mixture was stirred for 20 minutes, 1.6 ml of di-n-butyl phthalate was added. The obtained solution was heated at 80° C. and 77 ml of titanium tetrachloride was added dropwise. The temperature inside the flask was raised to 125° C. and the operation of contact was conducted under stirring for 2 hours. After the stirring was stopped, solid substances were precipitated and the supernatant liquid was removed. Then, 100 ml of dehydrated n-octane was added. The resultant mixture was heated at 125° C. under stirring and kept at this condition for 1 minute. After the stirring was stopped, solid substances were precipitated and the supernatant liquid was removed. This operation of washing was repeated 7 times. Then, 122 ml of titanium tetrachloride was added. The temperature inside the flask was raised to 125° C. and the second operation of contact was conducted. Then, the operation of washing with dehydrated n-octane was repeated 6 times and a solid catalyst component was obtained.

(2) Preparation of a Product of Preliminary Polymerization

After a three-necked flask having an inner volume of 0.5 liters and equipped with a stirrer was purged with nitrogen, a slurry in dehydrated n-octane containing the above solid catalyst component was added in an amount such that the mass of the solid substance was 12 g and the temperature was kept at 25° C. After 1.5 g of triethylaluminum B was added and the resultant mixture was stirred for 15 minutes, 1.1 g of dicyclopentyldimethoxysilane was added. The temperature of the resultant fluid was raised to 50° C. and propylene gas was introduced into the fluid at the rate of 50 ml/minute for 2 hours. Then, the introduction of propylene gas was stopped and the temperature was slowly lowered to 25° C. over 40 minutes. After the stirring was stopped, solid substances were precipitated and the supernatant liquid was removed. Then, 100 ml of dehydrated n-octane was added and the resultant fluid was stirred for 1 minute. After the stirring was stopped, solid substances were precipitated and the supernatant liquid was removed. This operation of washing was repeated 5 times and a product of preliminary polymerization was obtained.

(3) Polymerization

Into an autoclave made of stainless steel, having an inner volume of 5 liters and equipped with an inlet tube for materials and a stirrer, 30 g of homopolypropylene (the intrinsic viscosity: 0.96 dl/g) was placed as the seed powder. After the inside of the autoclave was sufficiently dried under a reduced pressure, the temperature inside the autoclave was raised to 80° C. under stirring. Hydrogen was introduced so that the partial pressure of hydrogen was adjusted to 0.6 MPa. Then, propylene was introduced and the total pressure was adjusted to 2.8 MPaG. Into the inlet tube for materials, 7.6 ml of triethylaluminum B (the content of aluminum hydride: 0.05% by weight), 0.5 ml of diethylzinc and 20 ml of dehydrated n-heptane were placed. These materials were then introduced into the autoclave utilizing the difference in the pressure between the inlet tube and the autoclave. Into the inlet tube for materials, 20 ml of dehydrated n-heptane, 0.4 mmole of triethylaluminum B, 1.0 mmole of dicyclopentyldimethoxysilane and the product of preliminary polymerization in an amount such that the amount of titanium was 0.02 mmole were placed. These materials were then introduced into the autoclave utilizing the difference in the pressure between the inlet tube and the autoclave. The polymerization was allowed to proceed for 1 hour while propylene was additionally introduced in a manner such that the total pressure was kept constant. Then, the temperature was lowered and the pressure was released. The product was taken out and dried under a reduced pressure and a polymer of propylene was obtained. The obtained results are shown in Table 1.

Example 2

The same procedures as those conducted in Example 1 were conducted except that diethylzinc was used in an amount of 1.0 mmole. The results are shown in Table 1.

Example 3

The same procedures as those conducted in Example 1 were conducted except that triethylaluminum C (the content of aluminum hydride: 0.004% by weight) was used. The results are shown in Table 1.

Example 4

The same procedures as those conducted in Example 3 were conducted except that diethylzinc was used in an amount of 1.0 mmole. The results are shown in Table 1.

Comparative Example 1

The same procedures as those conducted in Example 1 were conducted except that triethylaluminum A (the content of aluminum hydride: 0.6% by weight) was used. The results are shown in Table 1.

In Examples 1 and 3 and Comparative Example 1, the same amount of diethylzinc was used but the obtained MFR as the indicator of fluidity was different. Sufficient fluidity was not obtained in Comparative Example 1 in contrast to the fluidity obtained in Examples 1 and 3. As shown in the result of Comparative Example 2, fluidity of the same degree as those in Examples 1 and 3 could be obtained when the amount of diethylzinc was increased to twice the amount of Comparative Example 1. However, the amount of zinc residues contained in the polymer was considered to be greater than those in the polymers of Examples 1 and 3 when the yield was taken into consideration. Thus, it is shown that the processes in Examples 1 and 3 were more excellent from the standpoint of achieving both of the decrease in the zinc residues in the polymer and the excellent fluidity.

Comparative Example 2

The same procedures as those conducted in Comparative Example 1 were conducted except that diethylzinc was used in an amount of 1.0 mmole. The results are shown in Table 1.

In Examples 2 and 4 and Comparative Example 2, the same amount of diethylzinc was used but the obtained MFR as the indicator of fluidity was different. Sufficient fluidity was not obtained in Comparative Example 2 in contrast to the fluidity obtained in Examples 1 and 3.

Example 5

An autoclave made of stainless steel, having an inner volume of 1 liter and equipped with an inlet tube for materials and a stirrer was sufficiently dried and 360 ml of n-heptane, 2 mmole of triethylaluminum B, 1 mmole of diethylzinc and 0.25 mmole of dicyclopentyldimethoxysilane were placed into the autoclave. The temperature was raised to 80° C. and hydrogen was introduced so that the partial pressure of hydrogen was adjusted to 0.2 MPa. Then, propylene was introduced and the total pressure was adjusted to 0.8 MPaG. Into the inlet tube for materials, 20 ml of dehydrated n-heptane and the product of preliminary polymerization in an amount such that the amount of titanium was 0.02 mmole were placed. These materials were then introduced into the autoclave utilizing the difference in the pressure between the inlet tube and the autoclave. The polymerization was allowed to proceed for 1 hour while propylene was additionally introduced in a manner such that the total pressure was kept constant. The polymerization was terminated by introducing 20 ml of methanol from the inlet tube for materials. Then, the temperature was lowered and the pressure was released. The content was taken out into 2 liters of methanol and, after filtration and drying in vacuo, a polymer was obtained. The results are shown in Table 1.

Example 6

The same procedures as those conducted in Example 5 were conducted except that triethylaluminum C (the content of aluminum hydride: 0.004% by weight) was used. The results are shown in Table 1.

Comparative Example 3

The same procedures as those conducted in Example 1 were conducted except that triethylaluminum A (the content of aluminum hydride: 0.6% by weight) was used. The results are shown in Table 1.

In Examples 5 and 6 and Comparative Example 3, the same amount of diethylzinc was used but the obtained intrinsic viscosity as the indicator of the molecular weight was different. In Comparative Example 3, sufficient fluidity could not be obtained since the intrinsic viscosity was greater, i.e., the molecular weight was greater, than those in Examples 5 and 6.

ratio of the amounts by mole of ethylene to propylene was 3.5:6.5 was introduced and the total pressure was adjusted to 1.5 MPaG. The polymerization was allowed to proceed for 45 minutes (the second stage polymerization) Then, the temperature was lowered and the pressure was released. The product was taken out and dried in vacuo and a block copolymer of propylene was obtained. The obtained results are shown in Table 2.

Example 8

The same procedures as those conducted in Example 7 were conducted except that diethylzinc was used in an amount of 6.0 mmole. The results are shown in Table 2.

Comparative Example 4

The same procedures as those conducted in Example 7 were conducted except that diethylzinc was not used. The results are shown in Table 2.

TABLE 1

|  | Example | | | | | | Comparative Example | | |
| --- | --- | --- | --- | --- | --- | --- | --- | --- | --- |
|  | 1 | 2 | 3 | 4 | 5 | 6 | 1 | 2 | 3 |
| Content of aluminum hydride (% by weight) | 0.05 | 0.05 | 0.004 | 0.004 | 0.05 | 0.004 | 0.6 | 0.6 | 0.6 |
| Amount of diethylzinc (mmole) | 0.5 | 1.0 | 0.5 | 1.0 | 1.0 | 1.0 | 0.5 | 1.0 | 1.0 |
| Yield (g) | 570 | 590 | 670 | 640 | 57 | 68 | 680 | 830 | 51 |
| Intrinsic viscosity (dl/g) | 1.04 | 0.91 | 1.00 | 0.89 | 0.59 | 0.55 | 1.11 | 1.03 | 1.67 |
| Fluidity (MFR) (g/10 min) | 93 | 142 | 85 | 143 |  |  | 60 | 86 |  |
| Stereoregularity (mmmm) (% by mole) | 98.2 | 98.3 | 98.2 | 98.2 | 98.2 | 98.4 | 98.1 | 98.4 | 98.1 |

Example 7

Into an autoclave made of stainless steel, having an inner volume of 5 liters and equipped with an inlet tube for materials and a stirrer, 30 g of homopolypropylene was placed as the seed powder. After the inside of the autoclave was sufficiently dried under a reduced pressure, the temperature inside the autoclave was raised to 80° C. under stirring. Hydrogen and propylene were introduced so that the partial pressure of hydrogen was adjusted to 0.6 MPa and the total pressure was adjusted to 2.8 MPaG. Into the inlet tube for materials, 20 mmole of dehydrated n-heptane, 3.6 mmole of triethylaluminum and 1.0 mmole of diethylzinc were placed. These materials were then introduced into the autoclave utilizing the difference in the pressure between the inlet tube and the autoclave. Into the inlet tube for materials, 20 ml of dehydrated n-heptane, 0.4 mmole of triethylaluminum, 1.0 mmole of dicyclopentyldimethoxysilane and the preliminarily polymerized catalyst obtained in Example 1 in an amount such that the amount of titanium was 0.02 mmole were placed. These materials were then introduced into the autoclave utilizing the difference in the pressure between the inlet tube and the autoclave. The polymerization was allowed to proceed for 1 hour while propylene was additionally introduced in a manner such that the total pressure was kept constant (the first stage polymerization). After the temperature was lowered and the pressure was released, a small amount of the product was taken out. The pressure in the autoclave was reduced and the temperature was raised to 60° C. Hydrogen was added so that the pressure was adjusted to 0.1 MPaG. A mixed gas containing ethylene and propylene in amounts such that the Example 9

The same procedures as those conducted in Example 7 were conducted except that hydrogen was not introduced in the second stage polymerization. The results are shown in Table 2.

Example 10

The same procedures as those conducted in Example 8 were conducted except that hydrogen was not introduced in the second stage polymerization. The results are shown in Table 2.

Example 11

The same procedures as those conducted in Example 9 were conducted except that 1.0 mmole of ethanol was added at the start of the second stage polymerization. The results are shown in Table 2.

Comparative Example 5

The same procedures as those conducted in Example 9 were conducted except that diethylzinc was not used. The results are shown in Table 2.

TABLE 2

|  | Example | | Comparative Example | Example | | | Comparative Example |
|---|---|---|---|---|---|---|---|
|  | 7 | 8 | 4 | 9 | 10 | 11 | 5 |
| Amount of diethylzine (mmole) | 1.0 | 6.0 | 0.0 | 1.0 | 6.0 | 1.0 | 0.0 |
| Activity (tg/g-Ti) | 810 | 820 | 680 | 1050 | 1150 | 780 | 790 |
| Intrinsic viscosity of homopolymer portion (dl/g) (Portion soluble in p-xylene) | 1.04 | 0.90 | 1.17 | 1.00 | 0.94 | 1.01 | 1.24 |
| Intrinsic viscosity (dl/g) | 2.35 | 2.18 | 2.80 | 4.17 | 4.09 | 5.72 | 5.68 |
| Amount of soluble portion (% by weight) | 18.4 | 18.1 | 18.3 | 18.6 | 14.8 | 12.6 | 15.3 |
| Content of ethylene unit (% by weight) | 29.0 | 29.7 | 29.7 | 30.5 | 27.4 | 31.4 | 28.7 |

INDUSTRIAL APPLICABILITY

In accordance with the first invention of the present invention, an α-olefin polymer having extremely high stereoregularity, exhibiting excellent fluidity and containing a decreased amount of catalyst residues can be obtained industrially advantageously.

In accordance with the second invention, a block copolymer of propylene which has a homopolymer portion exhibiting excellent fluidity and a copolymer portion having a high molecular weight can be efficiently produced.

What is claimed is:

1. A process for producing an α-olefin polymer which comprises
    homopolymerizing an α-olefin or
    copolymerizing two or more α-olefins in the presence of
        (A) a solid catalyst component comprising
            a magnesium compound,
            a titanium compound,
            a halogen and
            a silicon compound represented by general formula (IV), $$Si(OR^{16})_q X^2_{4-q} \quad (IV)$$

(B) an organoaluminum compound having a content of hydroaluminum compound of 0.1% by weight or less and
        (C) an organozinc compound,
    wherein $R^{16}$ represents a hydrocarbon group,
    $X^2$ represents a halogen and
    q represents an integer of 0 to 3.

2. The process according to claim 1, wherein the solid catalyst component (A) further comprises an electron-donating agent.

3. The process according to claim 1, wherein the organozinc compound (C) is an organozinc compound represented by the formula:

$$ZnR^1R^2$$

wherein $R^1$ and $R^2$ each independently represent a hydrocarbon group having 1 to 10 carbon atoms.

4. The process according to claim 1, wherein said homopolymerizing or said copolymerizing is conducted in the presence of (D) an electron-donating compound.

5. The process according to claim 1, wherein the organoaluminum compound (B) has a content of hydroaluminum compound of 0.01% by weight or less.

6. A process for producing a block copolymer of propylene which comprises
    polymerizing a first propylene in the presence of
        (A) a solid catalyst component comprising
            a titanium compound,
            an electron-donating agent, and
            a silicon compound represented by general formula (IV), $$Si(OR^{16})_q X^2_{4-q} \quad (IV)$$

(B) an organoaluminum compound and
        (C) an organozinc compound to produce a crystalline polypropylene and then
    copolymerizing a second propylene and at least one additional monomer selected from the group consisting of ethylene and α-olefins, having 4 or more carbon atoms, in the presence of the crystalline polypropylene
    wherein $R^{16}$ represents a hydrocarbon group,
    $X^2$ represents a halogen and
    q represents an integer of 0 to 3.

7. The process according to claim 6, wherein the solid catalyst component (A) further comprises a magnesium compound.

8. The process according to claim 6, wherein said polymerizing a first propylene is conducted in the presence of (D) an electron-donating compound.

9. The process according to claim 8, wherein the electron-donating compound is an organosilicon compound.

10. The process according to claim 8, wherein the solid catalyst component (A) is produced by the process comprising:
    contacting the titanium compound and a magnesium compound in the presence of the electron-donating agent at a temperature of 120 to 150° C. and
    washing an obtained product with an inert solvent at a temperature of 100 to 150° C.

11. The process according to claim 10, wherein the solid catalyst component (A) is produced by the process comprising:
    contacting the titanium compound and the magnesium compound in the presence of the electron-donating agent and a silicon compound at a temperature of 120 to 150° C. and washing an obtained product with an inert solvent at a temperature of 100 to 150° C.

12. The process according to claim 6, wherein the organozinc compound (C) is an organozinc compound represented by the formula:

$$ZnR^1R^2$$

wherein $R^1$ and $R^2$ each independently represent a hydrocarbon group having 1 to 10 carbon atoms.

13. The process according to claim 6, wherein (E) an electron-donating substance is added before or during said copolymerizing a second propylene and at least one additional monomer.

14. A process for producing an α-olefin polymer according to claim 1, wherein the solid catalyst comprises a titanium compound represented by formula (II)

$$TiX^1{}_n(OR^7)_{4-p} \quad \text{(II)}$$

wherein $X^1$ represents a halogen atom,

R$^7$ represents a hydrocarbon group which may be a saturated group or an unsaturated group, may be a linear group, a branched group or cyclic group and may have hetero atoms, p represents an integer of 0 to 4.

15. A process for producing a block copolymer of propylene according to claim 6, wherein the solid catalyst comprises a titanium compound represented by formula (II)

$$TiX^1{}_n(OR^7)_{4-p} \quad \text{(II)}$$

wherein $X^1$ represents a halogen atom,

R$^7$ represents a hydrocarbon group which may be a saturated group or an unsaturated group, may be a linear group, a branched group or cyclic group and may have hetero atoms, p represents an integer of 0 to 4.

16. A process for producing an α-olefin polymer according to claim 3, wherein the solid catalyst comprises a titanium compound represented by formula (II)

$$TiX^1{}_n(OR^7)_{4-p} \quad \text{(II)}$$

wherein $X^1$ represents a halogen atom,

R$^7$ represents a hydrocarbon group which may be a saturated group or an unsaturated group, may be a linear group, a branched group or cyclic group and may have hetero atoms, p represents an integer of 0 to 4.

17. A process for producing a block copolymer of propylene according to claim 12, wherein the solid catalyst comprises a titanium compound represented by formula (II)

$$TiX^1{}_n(OR^7)_{4-p} \quad \text{(II)}$$

wherein $X^1$ represents a halogen atom,

R$^7$ represents a hydrocarbon group which maybe a saturated group or an unsaturated group, may be a linear group, a branched group or cyclic group and may have hetero atoms, p represents an integer of 0 to 4.

* * * * *